United States Patent
Kumano et al.

(10) Patent No.: US 7,304,838 B2
(45) Date of Patent: Dec. 4, 2007

(54) DISPLAY DEVICE

(75) Inventors: Daigaku Kumano, Tokyo (JP); Shinji Yamamura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/500,310

(22) Filed: Aug. 8, 2006

(65) Prior Publication Data
US 2007/0047187 A1 Mar. 1, 2007

(30) Foreign Application Priority Data
Aug. 26, 2005 (JP) .............................. 2005-245811

(51) Int. Cl.
*G06F 1/16* (2006.01)
(52) U.S. Cl. ................... 361/681; 248/921; 248/922
(58) Field of Classification Search ................ 361/681; 248/921–922, 125.1, 371
See application file for complete search history.

(56) References Cited

U.S. PATENT DOCUMENTS

| | | | | |
|---|---|---|---|---|
| 5,329,289 A | * | 7/1994 | Sakamoto et al. | 345/659 |
| 5,708,561 A | * | 1/1998 | Huilgol et al. | 361/681 |
| 5,941,493 A | * | 8/1999 | Cheng | 248/371 |
| 6,061,104 A | * | 5/2000 | Evanicky et al. | 248/274.1 |
| 6,233,139 B1 | * | 5/2001 | Hamon | 361/681 |
| 6,850,407 B2 | * | 2/2005 | Tanimoto et al. | 361/681 |
| 6,882,335 B2 | * | 4/2005 | Saarinen | 345/156 |
| 7,082,028 B2 | * | 7/2006 | Huilgol et al. | 361/681 |
| 2007/0014082 A1 | * | 1/2007 | Wang et al. | 361/681 |

FOREIGN PATENT DOCUMENTS

JP 2004-302491 10/2004

* cited by examiner

*Primary Examiner*—Jayprakash Gandhi
*Assistant Examiner*—Anthony Q Edwards
(74) *Attorney, Agent, or Firm*—Oblon, Spivak, McClelland, Maier & Neustadt, P.C.

(57) ABSTRACT

A display device includes a housing holding a display panel having a display screen which is of an elongate rectangular shape as viewed in front elevation, and a stand, the housing being angularly movably supported on the stand for angular movement about a support shaft extending perpendicular to the display screen. The support shaft is positioned on a line extending from a center of the display screen which is positioned in a landscape display mode, obliquely upwardly at an angle of substantially 45°.

3 Claims, 12 Drawing Sheets

$$\left(\frac{W-H}{2}\right)=B$$

DISPLAY DEVICE

CROSS REFERENCES TO RELATED APPLICATIONS

The present invention contains subject matter related to Japanese Patent Application JP 2005-245811 filed with the Japanese Patent Office on Aug. 26, 2005, the entire contents of which being incorporated herein by reference.

BACKGROUND OF THE INVENTION

1. Field of the Invention

The present invention relates to a display device, and more particularly to a display device with a display panel having a display screen whose vertical and horizontal dimensions are different from each other, the display device incorporating a technology for easily changing the display screen between a landscape display mode and a portrait display mode.

2. Description of the Related Art

Some display devices for use with personal computers include a display unit having a display screen of an elongate rectangular shape as viewed in front elevation. The display unit can be used selectively in a landscape display mode and a portrait display mode depending on how images are to be displayed on the display screen.

In such a display device, a rotational shaft Oa is disposed centrally on the display unit, as shown in FIG. 1 of the accompanying drawings. The display device is placed on a support surface, and the rotational shaft Oa is positioned at such a height from the support surface that the display unit does not conflict with the support surface when it is turned between the landscape display mode and the portrait display mode. There is a large positional difference B between the lower edge of a display unit housing CAB when it is in the landscape display mode ah and the lower edge of the display unit housing CAB when it is in the portrait display mode av. If the width and height of the display unit housing CAB in the landscape display mode ah are represented by W and H, respectively, the difference B is expressed by the following equation:

$$B=(W-H)/2$$

In the landscape display mode ah, the lower edge of the display unit housing CAB is higher than the lower edge thereof in the portrait display mode av, making the viewer feel odd.

Japanese Patent Laid-open No. 2004-302491 discloses a display device incorporating a vertically moving mechanism for vertically moving the rotational shaft when the display unit is turned. When the display unit is turned from the landscape display mode to the portrait display mode, the rotational shaft moves upwardly. When the display unit is turned from the portrait display mode to the landscape display mode, the rotational shaft moves downwardly.

With the disclosed display device, the display unit is prevented from conflicting the support surface when it is turned between the landscape display mode and the portrait display mode, and the lower edge of the display unit housing in the landscape display mode is positionally close to the lower edge of the display unit housing in the portrait display mode.

SUMMARY OF THE INVENTION

However, since the disclosed display device needs the vertically moving mechanism, it is structurally complex, demands a large-size display stand, and is highly costly to manufacture.

It is desirable to provide a display device which prevents a display panel housing from conflicting with a support surface when it is turned between a landscape display mode and a portrait display mode, and allows the lower edge of the display panel housing to be positioned freely in the landscape display mode and the portrait display mode, without using a complex and large mechanism.

To meet the above need, a display device according to the present invention includes a housing holding a display panel having a display screen which is of an elongate rectangular shape as viewed in front elevation, and a stand, the housing being angularly movably supported on the stand for angular movement about a support shaft extending perpendicular to the display screen. In the display device, the support shaft may be positioned on a line extending from a center of the display screen which is positioned in a landscape display mode, obliquely upwardly at an angle of substantially 45°.

With the above arrangement, the display device prevents the housing from conflicting with a support surface when it is turned between a landscape display mode and a portrait display mode, and allows the lower edge of the housing to be positioned freely in the landscape display mode and the portrait display mode, without the need for a complex and large mechanism.

A display device according to an embodiment of the present invention includes a housing holding a display panel having a display screen which is of an elongate rectangular shape as viewed in front elevation, and a stand, the housing being angularly movably supported on the stand for angular movement about a support shaft extending perpendicular to the display screen. In the display device, the support shaft may be positioned on a line extending from a center of the display screen which is positioned in a landscape display mode, obliquely upwardly at an angle of substantially 45°.

When the display panel is turned between the landscape display mode and the portrait display mode, the housing is prevented from conflicting with the support surface by a simple mechanism. The display device also allows the lower edge of the housing to be positioned freely in the landscape display mode and the portrait display mode, so that the lower edge of the housing in the landscape display mode and the lower edge of the housing in the portrait display mode can be held at the same height.

The distance between a lower end of the housing and the support shaft when the display screen is positioned in the landscape display mode and the distance between the lower end of the housing and the support shaft when the display screen is positioned in the portrait display mode are essentially equal to each other. Therefore, the height of the lower end of the housing as recognized by the user remains essentially unchanged between the landscape display mode and the portrait display mode.

The support shaft is vertically tiltably supported on the stand, and the display device further includes lock means for preventing the housing from being angularly moved with respect to the support shaft when the support shaft is in a normal position at a lower end of the range of vertical tilting movement thereof, and for allowing the housing to be angularly moved with respect to the support shaft when the support shaft is tilted upwardly from the normal position.

The lower end of the housing can be brought closer to the support surface. In the normal position, the housing is locked by the lock means against angular movement. Therefore, the user will not inadvertently turn the housing into conflict with the support surface in the normal position.

DETAILED DESCRIPTION OF THE PREFERRED EMBODIMENTS

Preferred embodiments of display devices according to the present invention will be described in detail below with reference to the drawings.

First, a display device according to a first embodiment of the present invention will be described below.

Figure 2:
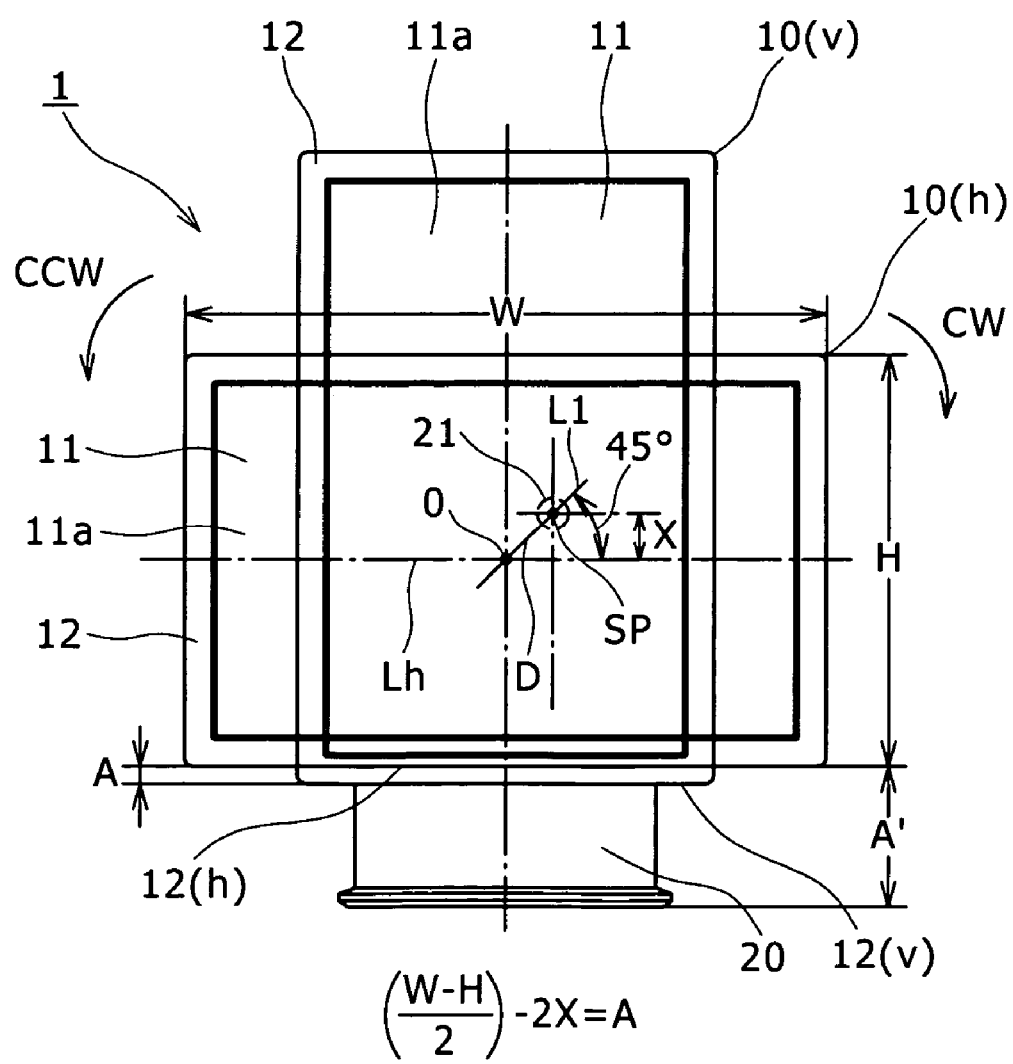
FIG. 2 is a front elevational view of a display device according to a first embodiment of the present invention, showing a display unit in both a landscape display mode and a portrait display mode.

FIG. 2 shows a basic arrangement of the display device according to the first embodiment.

As shown in FIG. 2, the display device, generally designated by 1, has a display unit 10 rotatably supported on a display stand 20. The display unit 10 includes a display panel 11 such as an LCD (Liquid Crystal Display) panel or the like supported in a display unit housing 12. In the first embodiment and a second embodiment to be described later, the display panel 11 may be a planar display panel such as a PDP (Plasma Display Panel) or the like rather than the LCD panel. The display panel 11 is of an elongate rectangular shape as viewed in front elevation, whose vertical and horizontal dimensions are different from each other. In FIG. 2, the vertical and horizontal dimensions of the display panel 11 have a ratio of 5:8. The display unit housing 12 is slightly greater in size than the display panel 11, and has vertical and horizontal dimensions also at a ratio of 5:8. The display panel 11 is supported in the display unit housing 12 with a display screen 11a facing forwardly. The display panel 11 and the display unit housing 12 have their respective centers positioned in substantial alignment with each other.

The display unit 10 is rotatably supported on the display stand 20 by a support shaft 21 for angular movement in a plane parallel to the display screen 11a.

The position where the display unit 10 is supported by the support shaft 21, i.e., a rotational center SP, is located on a line L1 extending from a center O of the display screen 11a when the display unit 10 is in a landscape display mode 10(h), i.e., when the display screen 11a is horizontally positioned, obliquely upwardly at an angle of 45° to a side edge 12(v) of the display unit housing 12 which becomes a lower edge when the display unit 10 is in a portrait display mode 10(v), i.e., when the display screen 11a is vertically positioned. In FIG. 2, for turning the display unit 10 clockwise in the direction indicated by the arrow CW from the landscape display mode 10(h) to the portrait display mode 10(v), the display unit 10 is supported by the support shaft 21 at the rotational center SP which is located on the line L1 extending from the center O of the display screen 11a obliquely upwardly to the right at the angle of 45°. Conversely, for turning the display unit 10 counterclockwise in the direction indicated by the arrow CCW from the landscape display mode 10(h) to the portrait display mode 10(v), the display unit 10 is supported by the support shaft 21 at a point which is located on a line extending from the center O of the display screen 11a obliquely upwardly to the left at the angle of 45°.

In FIG. 2, the width of the display unit housing 12 in the landscape display mode 10(h) is represented by W, the height of the display unit housing 12 in the landscape display mode 10(h) by H, and the height of the rotational center SP from a horizontal line Lh passing through the center O of the display screen 11a by X. A vertical positional difference A between the lower edge 12(h) of the display unit housing 12 in the landscape display mode 10(h) and the lower edge 12(v) of the display unit housing 12 in the portrait display mode 10(v) is expressed by $A=((W-H)/2)-2X$. Therefore, the vertical positional difference A can be set to a desired value by selecting the height X. If the distance D from the center O of the display screen 11a to the rotational center SP is set to a value expressed by the equation 1 below, then the lower edge 12(h) of the display unit housing 12 in the landscape display mode 10(h) and the lower edge 12(v) of the display unit housing 12 in the portrait display mode 10(v) are at the vertical same position, i.e., the vertical positional difference A is A=0.

$$D = \sqrt{2\left(\frac{W-H}{2}\right)^2} \times \frac{1}{2} \qquad \text{[Equation 1]}$$

Figure 1:
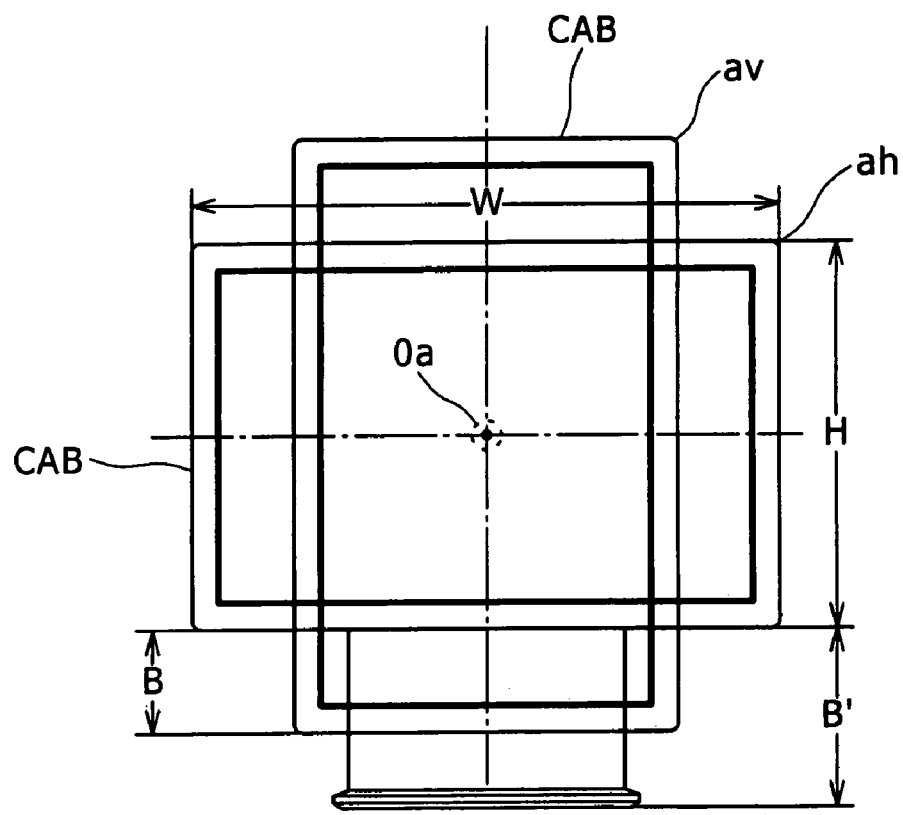
FIG. 1 is a front elevational view of a display device in the past, showing both a landscape display mode and a portrait display mode.

The distance A' from the lower edge 12(h) of the display unit housing 12 in the landscape display mode 10(h) to a support surface on which the display device 1 is supported, can be shorter than the distance B' from the lower edge of the display unit housing CAB in the landscape display mode ah of the display device in the past shown in FIG. 1 to the support surface.

FIGS. 3 through 6 show control indicator patterns of a control indicator assembly 30 and structural details of the control indicator assembly 30 according to the first embodiment.

The display device 1 has control items including power on/off, brightness adjustment, and luminance adjustment. For the power on/off, the display device 1 has a power key which, when pressed in a power off state, turns on the display device 1, and when pressed for a longer period in a power on state, turns off the display device 1. For the brightness adjustment, the display device 1 has an incremental key and a decremental key. When the incremental key is pressed, the displayed image becomes brighter, and when the decremental key is pressed, the displayed image becomes darker. For the luminance adjustment, the display device 1 also has an incremental key and a decremental key. When the incremental key is pressed, the displayed image becomes higher in luminance, and when the decremental key is pressed, the displayed image becomes lower in luminance. The display device 1 has control indicators indicative of these control keys with the above functions and characters or icons disposed near the control keys and representing their functions.

The functions of the control keys remain unchanged regardless of whether the display unit 10 is in the landscape display mode 10(h) or the portrait display mode 10(v). However, when the display unit 10 is turned from the landscape display mode 10(h) to the portrait display mode 10(v) or vice versa, the characters or icons representing the functions of the control keys are turned 90° and are not indicated properly. Specifically, the characters are toppled sideways and become harder to read though they are not totally illegible. The icons are also toppled sideways and can hardly be recognized with ease. For example, the icon of the power key is toppled sideways, and the icon "–" of each of the incremental keys changes to "l".

Figure 3:
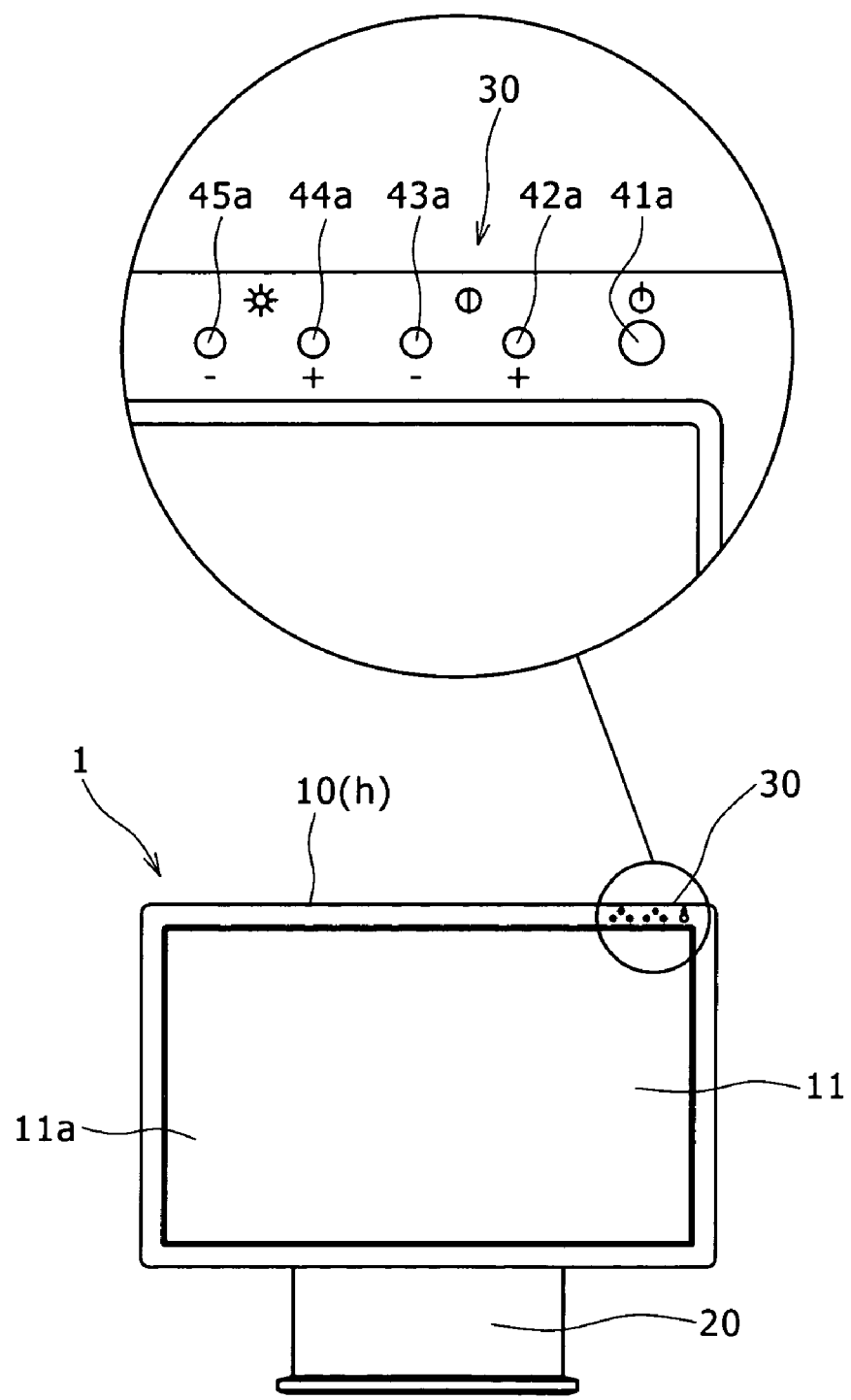
FIG. 3 is a front elevational view of the display device according to the first embodiment, showing a control indicator pattern in the landscape display mode.
Figure 4:
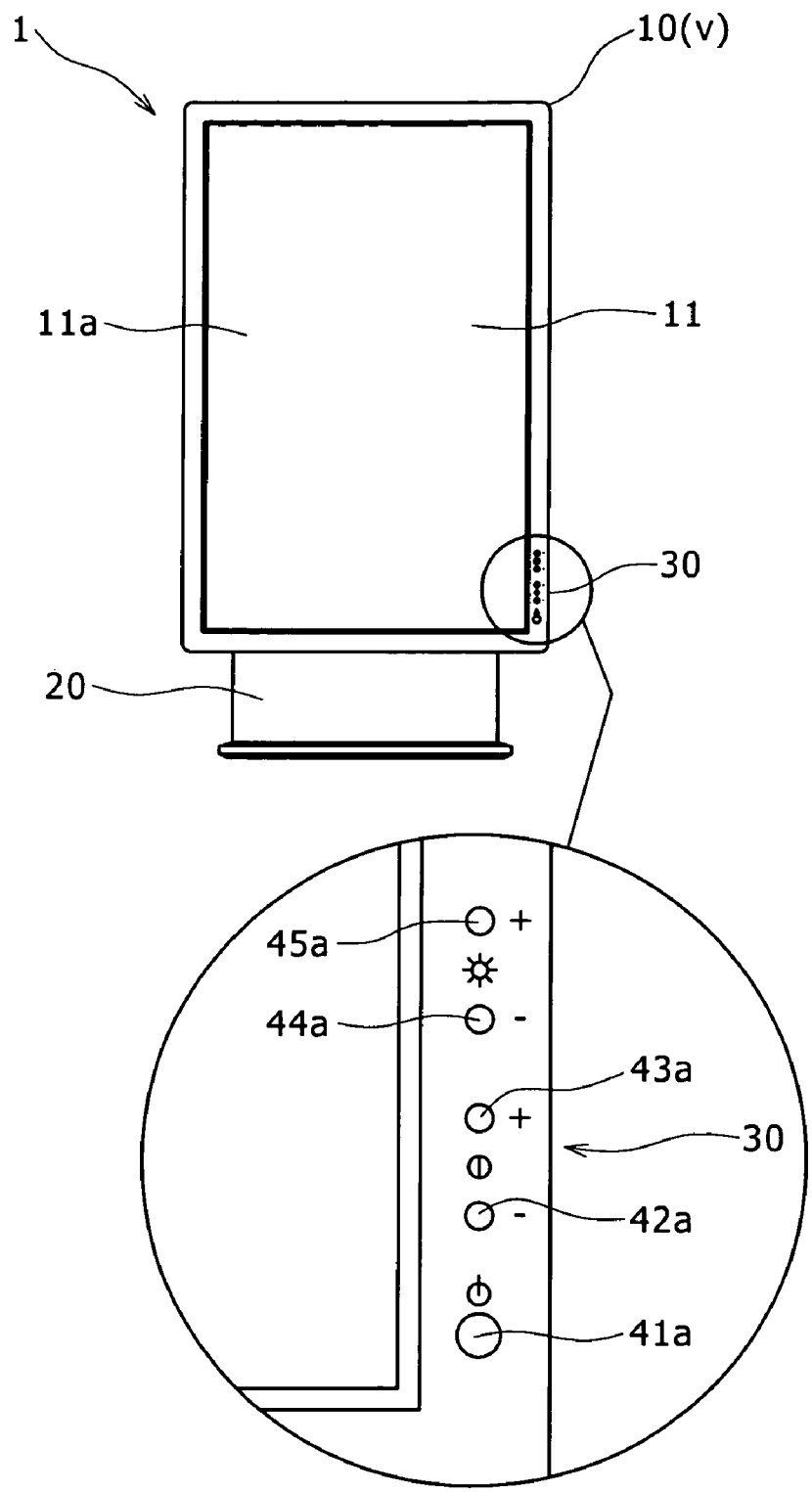
FIG. 4 is a front elevational view of the display device according to the first embodiment, showing a control indicator pattern in the portrait display mode.

In view of the above problem, the control indicator assembly 30 of the display device 1 is constructed such that it indicates icons as shown in FIG. 3 when the display unit 10 is in the landscape display mode 10(h) and it indicates icons as shown in FIG. 4 when the display unit 10 is in the portrait display mode 10(v).

Figure 5:
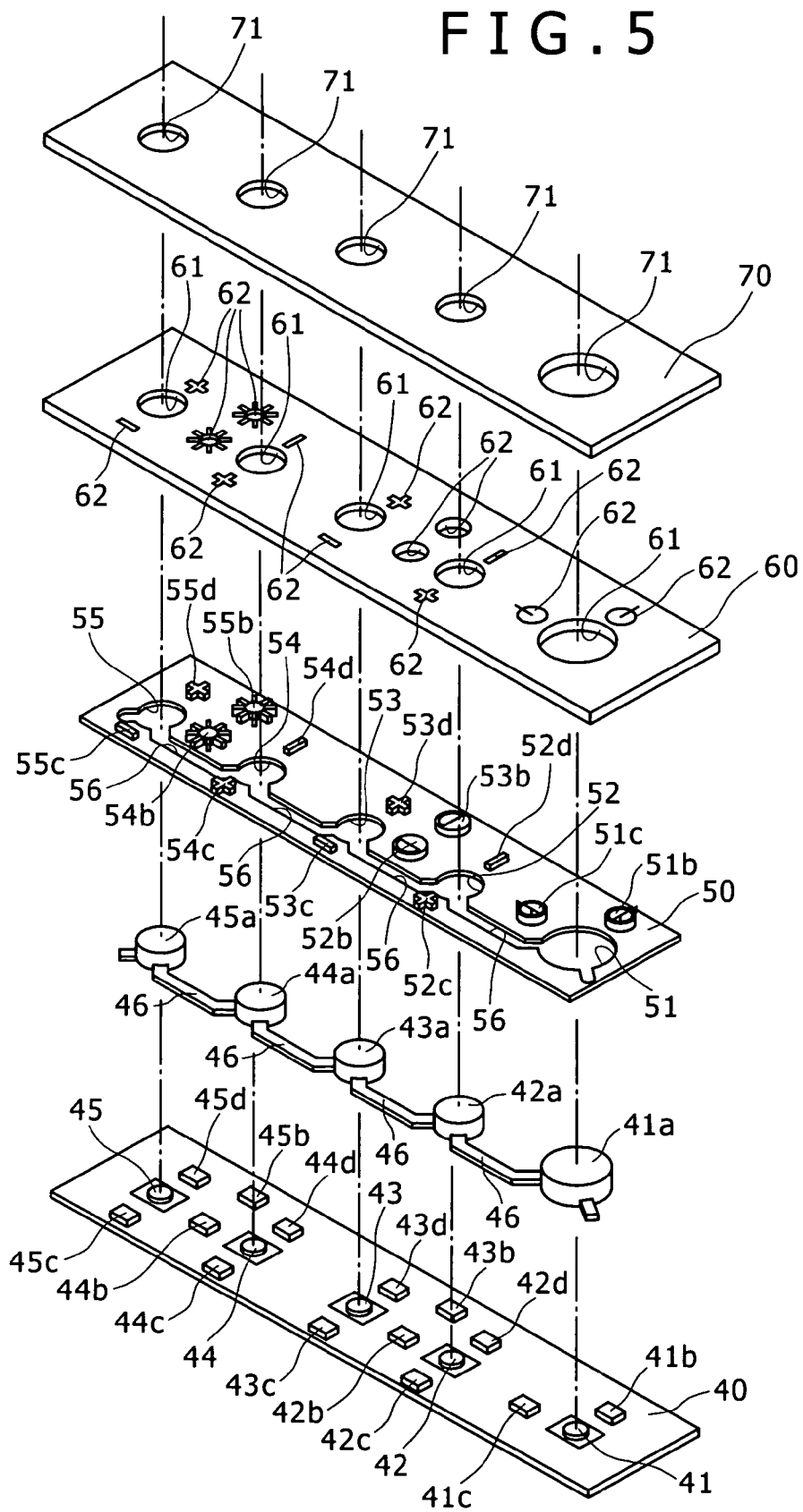
FIG. 5 is an enlarged exploded perspective view of a control indicator assembly of the display device according to the first embodiment.
Figure 6:
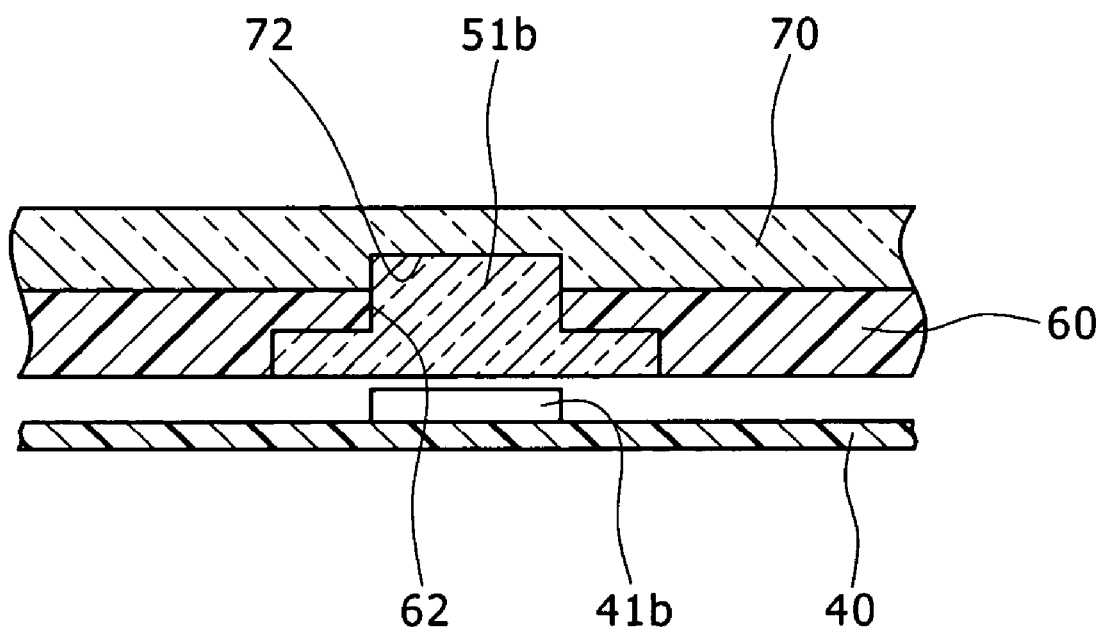
FIG. 6 is an enlarged fragmentary cross-sectional view of a portion of the control indicator assembly shown in FIG. 5.

Specific structural details of the control indicator assembly 30 are shown in FIGS. 5 and 6.

As shown in FIGS. 5 and 6, the control indicator assembly 30 includes a circuit board 40 disposed in the display unit housing 12 and having push-button switches 41, 42, 43, 44, 45 arrayed on a front surface thereof. For example, in FIG. 3 the push-button switch 41 serves as a power on/off switch, the push-button switch 42 as a brightness adjustment incremental switch, the push-button switch 43 as a brightness adjustment decremental switch, the push-button switch 44 as a luminance incremental switch, and the push-button switch 45 as a luminance decremental switch. Push keys 41a, 42a, 43a, 44a, 45a are disposed in front of the push-button switches 41, 42, 43, 44, 45, respectively, and are integrally joined together by thin flexible joints 46.

Directions which will be referred to in the description of the control indicator assembly 30 are given with reference to FIG. 3. The circuit board 40 also supports thereon various light-emitting diodes (hereinafter referred to as LED). An LED 41b is disposed near and upwardly of the power on/off switch 41, and an LED 41c is disposed leftwardly of the power on/off switch 41. An LED 42b is disposed between the brightness decrementing push-button switch 42 and the brightness incrementing push-button switch 43, and an LED 43b is disposed near and upwardly of the LED 42b. An LED 42c is disposed near and downwardly of the push-button switch 42, and an LED 42d is disposed near and upwardly of the push-button switch 42. An LED 43c is disposed near and downwardly of the push-button switch 43, and an LED 43d is disposed near and upwardly of the push-button switch 43. An LED 44b is disposed between the push-button switches 44, 45, and an LED 45b is disposed near and upwardly of the LED 44b. An LED 44c is disposed near and downwardly of the push-button switch 44, and an LED 44d is disposed near and upwardly of the push-button switch 44. An LED 45c is disposed near and downwardly of the push-button switch 45, and an LED 45d is disposed near and upwardly of the push-button switch 45.

The control indicator assembly 30 also includes a semi-transparent, e.g., lacteous, lens plate 50 disposed over the front surface of the circuit board 40.

The lens plate 50 has an array of insertion holes 51, 52, 53, 54, 55 defined therein. The push keys 41a, 42a, 43a, 44a, 45a on the circuit board 40 project forwardly respectively through the insertion holes 51, 52, 53, 54, 55. The insertion holes 51, 52, 53, 54, 55 are joined together by slits 56.

Indicator protrusions 51b, 51c shaped as icons indicative of power on/off switches are disposed on a front surface of the lens plate 50 near and upwardly and leftwardly, respectively, of the insertion hole 51. The indicator protrusion 51b is shaped so as to be oriented normally when the display unit 10 is in the landscape display mode 10(h), and the indicator protrusion 51c is shaped so as to be oriented normally when the display unit 10 is in the portrait display mode 10(v). The indicator protrusion 51b is positioned forwardly of the LED 41b, and the indicator protrusion 51c is positioned forwardly of the LED 41c.

An indicator protrusion 52b shaped as an icon indicative of a brightness adjustment switch is disposed on the front surface of the lens plate 50 between the insertion holes 52, 53, and another indicator protrusion 53b shaped as an icon indicative of a brightness adjustment switch is disposed on the front surface of the lens plate 50 near and upwardly of the indicator protrusion 52b. The indicator protrusion 52b is shaped so as to be oriented normally when the display unit 10 is in the portrait display mode 10(v), and the indicator protrusion 53b is shaped so as to be oriented normally when the display unit 10 is in the landscape display mode 10(h). An indicator protrusion 52c shaped as a plus sign (+) is disposed on the front surface of the lens plate 50 near and downwardly of the insertion hole 52, and an indicator protrusion 52d shaped as a minus sign (–) is disposed on the front surface of the lens plate 50 near and upwardly of the insertion hole 52. An indicator protrusion 53c shaped as a minus sign (–) is disposed on the front surface of the lens plate 50 near and downwardly of the insertion hole 53, and an indicator protrusion 53d shaped as a plus sign (+) is disposed on the front surface of the lens plate 50 near and upwardly of the insertion hole 53. The indicator protrusions 52c, 53c are shaped so as to be oriented normally when the display unit 10 is in the landscape display mode 10(h), and the indicator protrusions 52d, 53d are shaped so as to be oriented normally when the display unit 10 is in the portrait display mode 10(v). The indicator protrusion 52b is positioned forwardly of the LED 42b, the indicator protrusion 52c forwardly of the LED 42c, the indicator protrusion 52d forwardly of the LED 42d, the indicator protrusion 53b forwardly of the LED 43b, the indicator protrusion 53c forwardly of the LED 43c, and the indicator protrusion 53d forwardly of the LED 43d.

An indicator protrusion 54b shaped as an icon indicative of a luminance adjustment switch is disposed on the front surface of the lens plate 50 between the insertion holes 54, 55, and another indicator protrusion 55b shaped as an icon indicative of a luminance adjustment switch is disposed on the front surface of the lens plate 50 near and upwardly of the indicator protrusion 54b. The indicator protrusion 54b is shaped so as to be oriented normally when the display unit 10 is in the portrait display mode 10(v), and the indicator protrusion 55b is shaped so as to be oriented normally when the display unit 10 is in the landscape display mode 10(h). An indicator protrusion 54c shaped as a plus sign (+) is disposed on the front surface of the lens plate 50 near and downwardly of the insertion hole 54, and an indicator protrusion 54d shaped as a minus sign (−) is disposed on the front surface of the lens plate 50 near and upwardly of the insertion hole 54. An indicator protrusion 55c shaped as a minus sign (−) is disposed on the front surface of the lens plate 50 near and downwardly of the insertion hole 55, and an indicator protrusion 55d shaped as a plus sign (+) is disposed on the front surface of the lens plate 50 near and upwardly of the insertion hole 55. The indicator protrusions 54c, 55c are shaped so as to be oriented normally when the display unit 10 is in the landscape display mode 10(h), and the indicator protrusions 54d, 55d are shaped so as to be oriented normally when the display unit 10 is in the portrait display mode 10(v). The indicator protrusion 54b is positioned forwardly of the LED 44b, the indicator protrusion 54c forwardly of the LED 44c, the indicator protrusion 54d forwardly of the LED 44d, the indicator protrusion 55b forwardly of the LED 45b, the indicator protrusion 55c forwardly of the LED 45c, and the indicator protrusion 55d forwardly of the LED 45d.

The control indicator assembly 30 also includes a light-impermeable light-shielding plate 60, which is typically black in color, disposed forwardly of the lens plate 50. The light-shielding plate 60 has an array of insertion holes 61, defined therein and a plurality of slots 62 defined therein. The push keys 41a, 42a, 43a, 44a, 45a are inserted forwardly through the insertion holes 61, respectively, and all the indicator protrusions on the lens plate 50 are inserted forwardly through the slots 62, respectively.

The light-shielding plate 60 has a front surface covered with a surface plate 70 of smoky color. The surface plate 70 has an array of insertion holes 71 defined therein, and the push keys 41a, 42a, 43a, 44a, 45a have respective front ends projecting forwardly through the insertion holes 71. The indicator protrusions on the lens plate 50 which are inserted forwardly through the respective slots 62 have front ends held in biting engagement with a rear surface of the surface plate 70. Specifically, the rear surface of the surface plate 70 has a plurality of recesses 72 (for example, one shown in FIG. 6) defined therein, and the front ends of the indicator protrusions, e.g, 51b, 51c on the lens plate 50 are fitted respectively in the recesses 72, as shown in FIG. 6.

When an LED, e.g., the LED 41b, which corresponds to the indicator protrusion 51b is energized, light emitted from the LED 41b brightens the indicator protrusion 51b, which is visually recognized through the surface plate 70 of smoky color on the front face of the control indicator assembly 30. When the display unit 10 is in the landscape display mode 10(h) as shown in FIG. 3, only the LEDs 41b, 42c, 43b, 43c, 44c, 45b, 45c are energized, and hence only the indicator protrusions 51b, 52c, 53b, 53c, 54c, 55b, 55c are visually recognized on the front face of the control indicator assembly 30. When the display unit 10 is in the portrait display mode 10(v) as shown in FIG. 4, only the LEDs 41c, 42b, 42d, 43d, 44b, 44d, 45d are energized, and hence only the indicator protrusions 51c, 52b, 52d, 53d, 54b, 54d, 55d visually recognized on the front face of the control indicator assembly 30. The LEDs are selectively energized based on whether the display unit 10 is in the landscape display mode 10(h) or the portrait display mode 10(v) as detected by a Hall device, not shown, mounted on the circuit board 40 in the display unit housing 12.

FIGS. 7 through 14 show a display device 100 according to a second embodiment of the present invention.

As shown in FIGS. 7 through 11, the display device 100 has a display unit 110 rotatably supported on a display stand 120. The display unit 110 comprises a display panel 111 such as an LCD panel or the like supported in a display unit housing 112. The display panel 111 is of an elongate rectangular shape as viewed in front elevation, whose vertical and horizontal dimensions are different from each other. The display panel 111 is supported in the display unit housing 112 with a display screen 11a facing forwardly. The display panel 111 and the display unit housing 112 have their respective centers positioned in substantial alignment with each other.

The display unit 110 is rotatably supported on the display stand 120 by a support shaft, to be described later, for angular movement in a plane parallel to the display screen 111a. The position where the display unit 110 is supported by the support shaft, i.e., a rotational center, is located on a line extending from a center of the display screen 111a when the display unit 110 is in a landscape display mode obliquely upwardly at an angle of 45° to a side edge of the display unit housing 112 which becomes a lower edge when the display unit 110 is in a portrait display mode. With this arrangement, any vertical positional difference between the lower edge of the display unit housing 112 when the display unit 110 is in the landscape display mode and the lower edge of the display unit housing 112 when the display unit 110 is in the portrait display mode.

The display stand 120 has a base 121 that is stably placed on a support surface, e.g., a desk surface on which the display device 100 is placed, and an upright wall 122 extending upwardly and slightly obliquely rearwardly from the rear end of the base 121. A shaft support channel 123 (see FIGS. 11 and 12) is vertically tiltably mounted on an upper end of the upright wall 122, and a support shaft 124 projects substantially forwardly from the shaft support channel 123. The display unit 110 is rotatably supported at its rotational center on the support shaft 124. The shaft support channel 123 is vertically tiltable between a position indicated by the two-and-dot lines in FIG. 11 and a position indicated by the solid lines in FIG. 11. The shaft support channel 123 can be click-stopped selectively in the two-and-dot-line position and the solid-line position. The support shaft 124 is angularly movable in an angular range of about 90° with respect to the shaft support channel 123. When the shaft support channel 123 is in the two-and-dot-line position shown in FIG. 11, the display screen 111a faces slightly upwardly in the forward direction.

Figure 12:
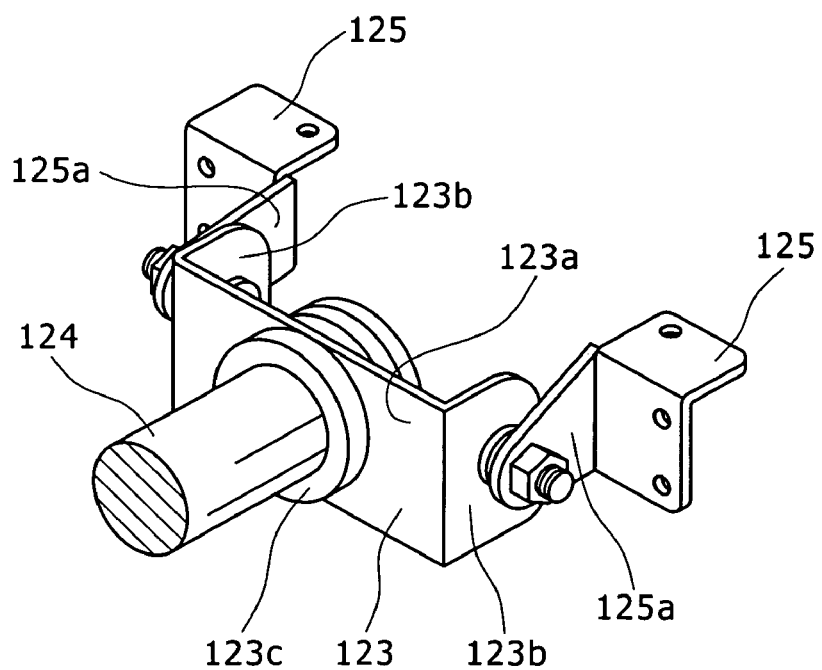
FIG. 12 is an enlarged perspective view of a support shaft assembly by which the display unit according to the second embodiment is supported on a display stand.

FIG. 12 shows structural details around the support shaft 124. The shaft support channel 123 is substantially C-shaped as viewed in plan, and is in the form of a unitary metal sheet including a main wall 123a facing essentially forwardly and a pair of laterally spaced support arms 123b bent substantially rearwardly from the opposite side edges of the main wall 123a. A tubular shaft support 123c is disposed on the main wall 123a and has an axis extending transversely across the main wall 123a. Two support angles 125 are fixedly mounted on the upper end of the upright wall 122 at laterally spaced positions, respectively, thereon. The support angles 125 have respective support arms 125a projecting integrally forwardly therefrom. The support arms 123b of the shaft support channel 123 are vertically angularly movably supported on the respective support arms 125a. An angular movement limiting means, not shown, is interposed between the shaft support channel 123 and the support angles 125 for limiting the angular movement range of the shaft support channel 123 between the two-and-dot-line position and the solid-line position shown in FIG. 11 and click-stopping the shaft support channel 123 selectively in the two-and-dot-line position and the solid-line position.

The support shaft 124 is supported by the tubular shaft support 123c on the shaft support channel 123 for angular movement through 90°, and is fixed at the rotational center of the display unit 110. Another angular movement limiting means, not shown, is interposed between the tubular shaft support 123c and the support shaft 124 for limiting angular movement of the support shaft 124 to an angular range of 90°.

Figure 13:
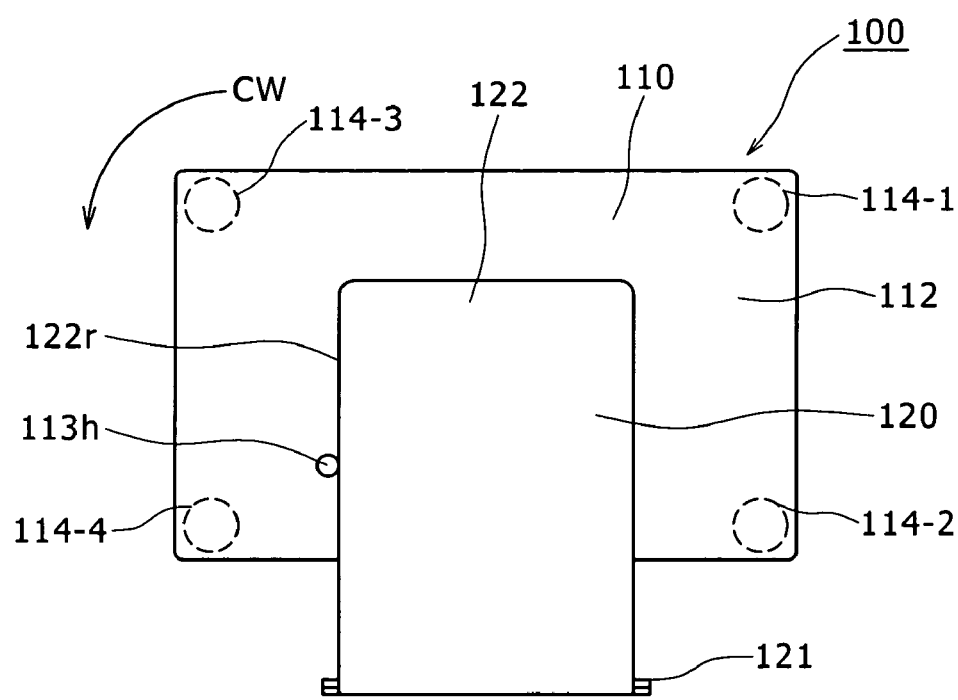
FIG. 13 is a rear elevational view of the display device according to the second embodiment, showing the display unit in the landscape display mode.
Figure 14:
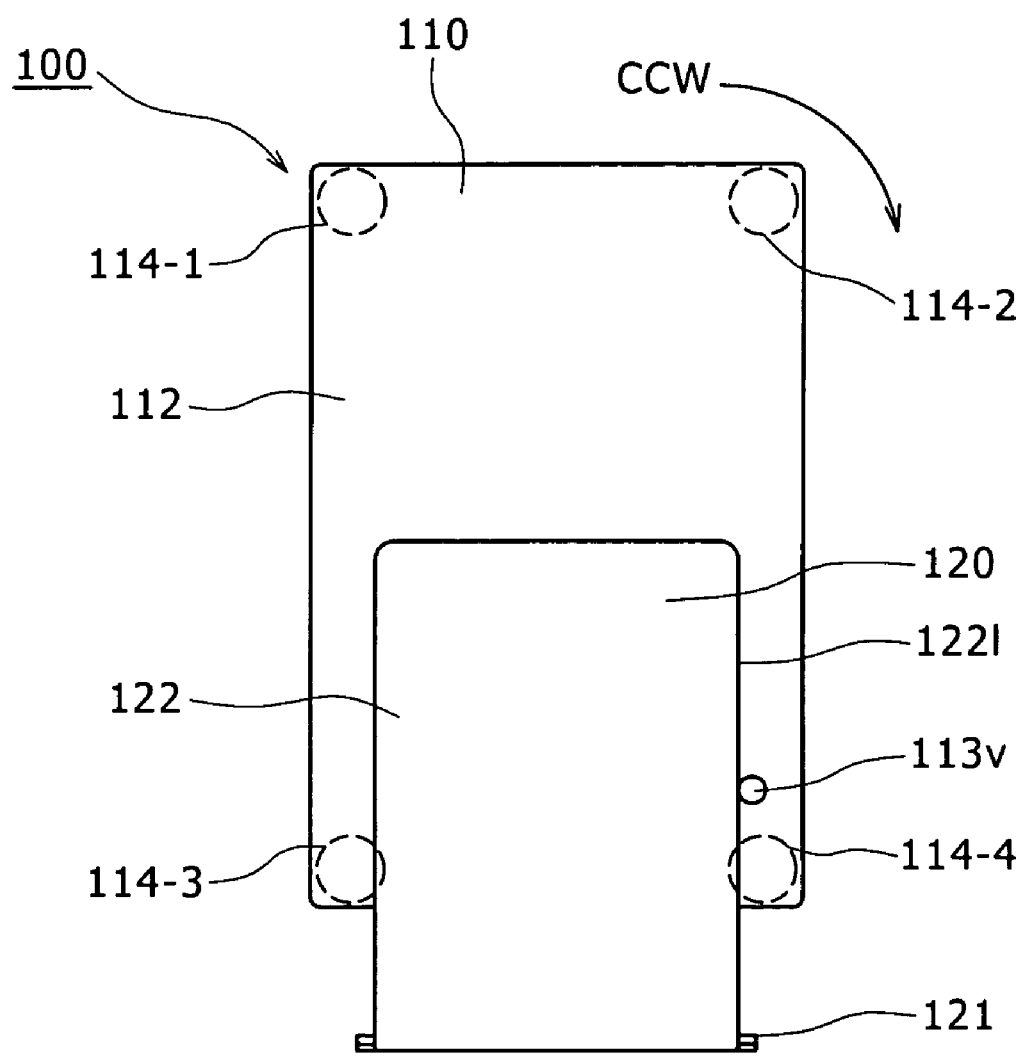
FIG. 14 is a rear elevational view of the display device according to the second embodiment, showing the display unit in the portrait display mode.

As shown in FIGS. 13 and 14, two stopper protrusions (lock means) 113h, 113v are disposed on a rear surface of the display unit housing 112 at respective positions that are angularly spaced 90° from each other about the rotational center. When the display unit 110 is in the landscape display mode, the stopper protrusion 113h engages a right side edge 122r of the upright wall 122 of the stand 120 (see FIG. 13). When the display unit 110 is in the portrait display mode, the stopper protrusion 113v engages a left side edge 122l of the upright wall 122 of the stand 120 (see FIG. 14). Therefore, even when an attempt is made to turn the display unit 110 clockwise (as viewed from its front side) in the direction indicated by the arrow CW in FIG. 13 from the landscape display mode into the portrait display mode, since the stopper protrusion 113h engages the right side edge 122r of the upright wall 122, the display unit 110 cannot be turned clockwise. Conversely, even when an attempt is made to turn the display unit 110 counterclockwise (as viewed from its front side) in the direction indicated by the arrow CCW in FIG. 14 from the portrait display mode into the landscape display mode, since the stopper protrusion 113v engages the left side edge 122l of the upright wall 122, the display unit 110 cannot be turned counterclockwise.

When the display unit 110 is in either the portrait display mode or the landscape display mode, a space 101 (see FIG. 11) is provided between the lower edge of the display unit 110 and the base 121 of the display stand 120. The space 101 may be used to accommodate a keyboard 130 of a personal computer, for example, therein. Therefore, when the keyboard 130 is not in use, the keyboard 130 may be removed from the support surface and placed into the space 101, making the space on the support surface available for other use. When the keyboard 130 is to be used, the keyboard 130 may be pulled out of the space 101 onto the support surface in front of the base 121, as indicated by the two-dot-and-dash lines in FIG. 11.

FIGS. 7 through 10 show a procedure for turning the display unit 110 from the landscape display mode to the portrait display mode.

Figure 7:
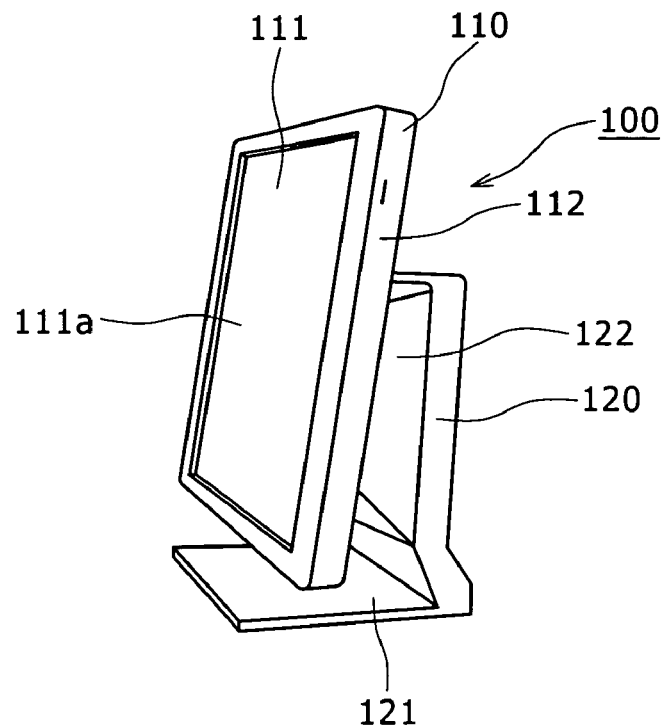
FIG. 7 is a perspective view of a display device according to a second embodiment of the present invention, showing a display unit in a landscape display mode.
Figure 8:
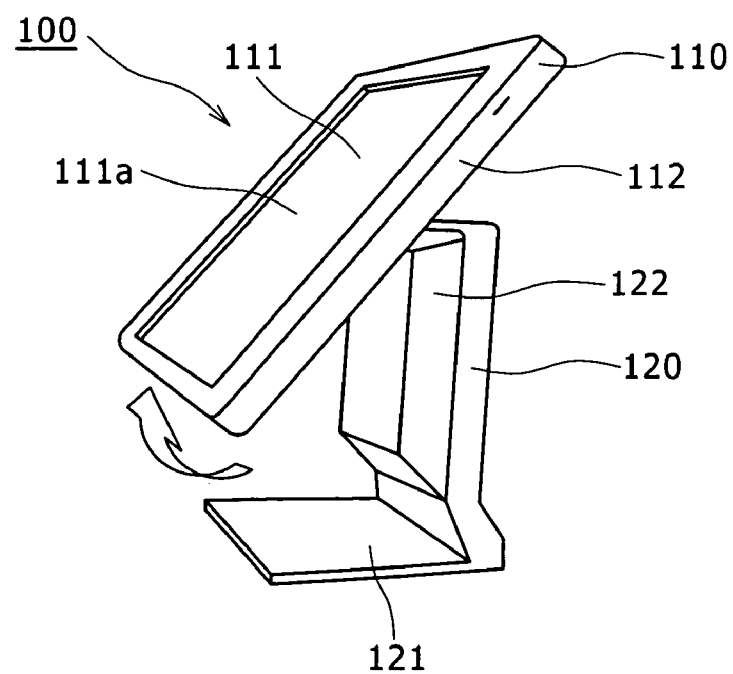
FIG. 8 is a perspective view of the display device according to the second embodiment, showing the display unit tilted upwardly by moving forwardly the lower edge of the display unit from the position shown in FIG. 7 in preparation for turning the display unit.
Figure 9:
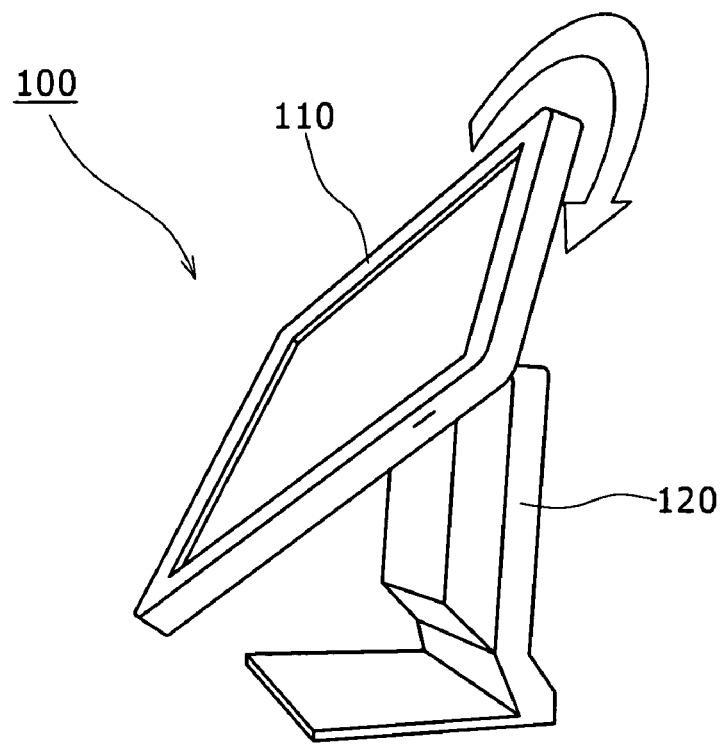
FIG. 9 is a perspective view of the display device according to the second embodiment, showing the display unit being turned clockwise from the position shown in FIG. 8.

FIG. 7 shows the display unit 110 in the landscape display mode. First, the lower end of the display unit 110 is held and pulled forwardly to release the shaft support channel 123 from the click-stopped position, and the display unit 110 is turned until the display screen 11a faces slightly upwardly as indicated by the arrow in FIG. 8. The shaft support channel 123 is now brought into the solid-line position shown in FIG. 11. In the position shown in FIG. 8, since the stopper protrusion 113h of the display unit 110 disengages forwardly from the right side edge 122r of the upright wall 122, the display unit 110 is unlocked for angular movement. Then, the display unit 110 is turned clockwise as viewed from the front side thereof as indicated by the arrow in FIG. 9. In FIG. 9, a corner of the display unit 110 is shown as being in a lowermost position. When the angular movement of the display unit 110 is limited, the lower end of the display unit 110 is pushed rearwardly as indicated by the arrow in FIG. 10 until the shaft support channel 123 is brought into the two-dot-and-dash-line position in FIG. 11. The display unit 110 is now in the portrait display mode (see FIG. 10). In the portrait display mode, as shown in FIG. 14, the stopper protrusion 113v engages the left side edge 122l of the upright wall 122 of the stand 120, preventing the display unit 110 from being turned counterclockwise.

Figure 10:
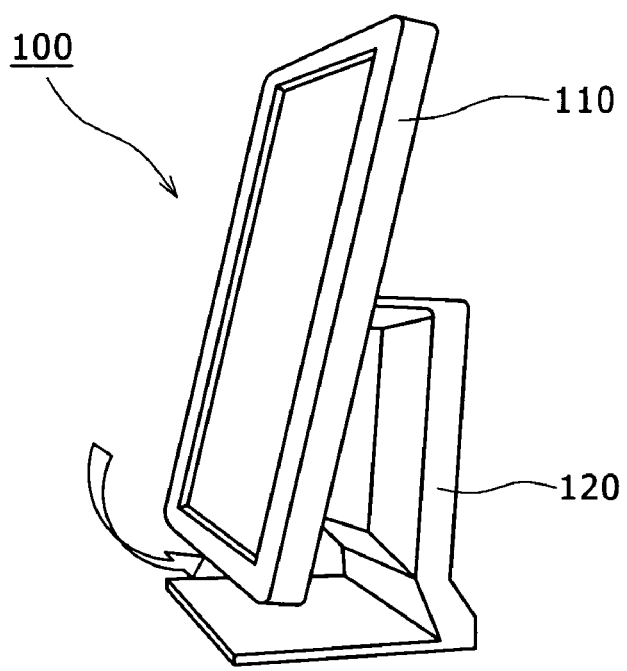
FIG. 10 is a perspective view of the display device according to the second embodiment, showing the display unit in a portrait display mode after it is turned and the lower end thereof is pushed backward.
Figure 11:
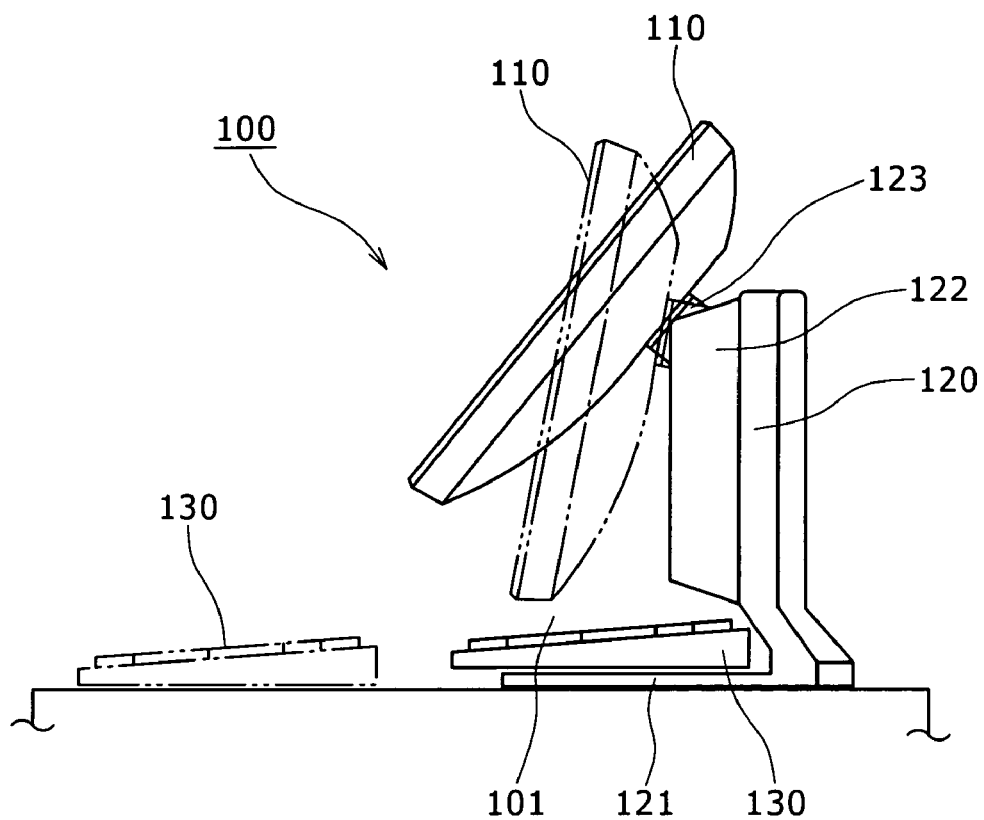
FIG. 11 is a side elevational view of the display device according to the second embodiment.

For turning the display unit 110 from the portrait display mode to the landscape display mode, the lower end of the display unit 110 is pulled from the position shown in FIG. 10, and then the display unit 110 is turned 90° counterclockwise. After the display unit 110 has been turned, the lower end of the display unit 110 is pushed rearwardly.

The display device 100 according to the second embodiment may incorporate therein the control indicator assembly 30 of the display device 1 according to the first embodiment.

As shown in FIGS. 13 and 14, the display unit housing 112 houses speakers 114-1, 114-2, 114-3, 114-4 respectively in four corners thereof, as indicated by the broken lines. For stereophonic sound reproduction, when the display unit 110 is in the landscape display mode, the speakers 114-1, 114-2 radiate sounds in the left channel and the speakers 114-3, 114-4 radiate sounds in the right channel, and when the display unit 110 is in the portrait display mode, the speakers 114-2, 114-4 radiate sounds in the left channel and the speakers 111-1, 114-3 radiate sounds in the right channel.

Figure 15:
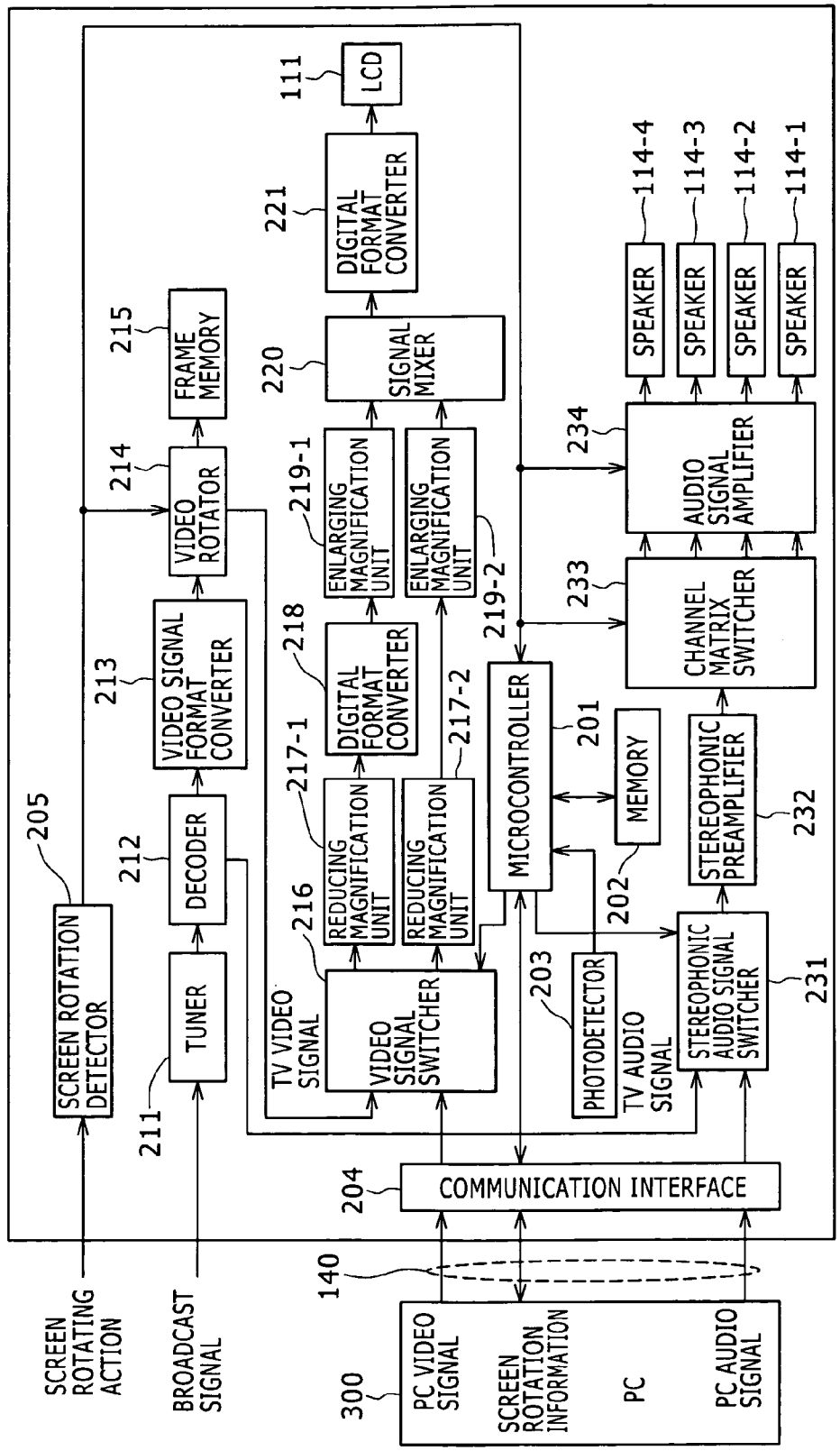
FIG. 15 is a block diagram of an internal circuit of the display device according to the second embodiment.

FIG. 15 shows in block form an internal circuit 200 of the display device 100 according to the second embodiment. In FIG. 15, the display device 100 is used as a display of a personal computer (hereinafter referred to as PC) 300.

The display device 100 is supplied with video signals of broadcast signals received from broadcasting stations, not shown, video signals from the PC 300 connected thereto, audio signals of broadcast signals received from broadcasting stations, and audio signals from the PC 300 connected thereto.

The internal circuit 200 has a microcontroller 201 for controlling the display device 100 in its entirety, receiving control signals from an external source, and sending signals to and receiving signals from the PC 300.

A memory 202 is connected to the microcontroller 201. The memory 202 comprises a mask ROM (Read Only Memory), an EPROM (Erasable Programmable ROM), an EEPROM (Electrically Erasable Programmable ROM) flash memory such as a flash memory, or the like, and stores fixed parameters which needs in processing operation of the display device 100 and the microcontroller 201.

A photodetector 203 is also connected to the microcontroller 201. The photodetector 203 detects an infrared radiation from a remote controller, not shown, that is operated by the user and supplies a control signal corresponding to the detected infrared radiation to the microcontroller 201.

The microcontroller 201 sends signals to and receives signals from an external device such as the PC 300 through a communication interface 204.

The display device 100 and the PC 300 are connected to each other by a DDC (Display Data Channel) bus (hereinafter referred to as DDC) 140 based on the DVI (Digital Visual Interface) standards. The communication interface 204 receives a PC video signal sent from the PC 300 through the DDC 140, outputs the received PC video signal to a certain circuit, receives a PC audio signal sent from the PC 300 through the DDC 140, and outputs the received PC audio signal to a certain circuit. The communication interface 204 sends display device information such as screen rotation information and display mode information from the microcontroller 201 through the DDC 140 to the PC 300, receives control signals from the PC 300, and supplies the received control signals to the microcontroller 201.

A screen rotation detector 205 is mounted on the display unit housing 112 of the display device 100. The screen rotation detector 205 comprises, for example, a Hall device disposed in an appropriate position on the upright-wall 122 for generating an output voltage when a magnetic flux from a magnet, not shown, passes through the Hall device. When the screen rotation detector 205 moves across the magnetic flux while the display unit 110 is angularly moved through 90° to change the orientation of the display screen 111*a*, the screen rotation detector 205 generates an output voltage for thereby detecting the angular movement of the display unit 110. The output voltage (detected signal) from the screen rotation detector 205 is supplied to the microcontroller 201 and other circuits.

When the screen rotation detector 205 outputs a detected signal in the landscape display mode, the microcontroller 201 judges that the display unit 110 has changed from the landscape display mode to the portrait display mode, and processes video and audio signals into those according to the portrait display mode. Conversely, when the screen rotation detector 205 outputs a detected signal in the portrait display mode, the microcontroller 201 judges that the display unit 110 has changed from the portrait display mode to the landscape display mode, and processes video and audio signals into those according to the landscape display mode.

Depending on the screen rotation signal from the screen rotation detector 205, the microcontroller 201 controls the communication interface 204 to send information representing that the display unit 110 has been turned through the DDC 140 to the PC 300. If the PC 300 has not been booted at this time, then the microcontroller 201 stores information as to the display mode, i.e., the landscape display mode or the portrait display mode into the memory 202. When the PC 300 is subsequently booted, the microcontroller 201 sends the stored display mode information from the memory 202 to the PC 300.

The display device 100 sends and receives video signals (R, G, B), audio signals, and other control signals to and from the PC 300 through the DDC 140. The display device 100 also sends display device information, which is information as to the display device 100 such as a display format and a resolution, to the PC 300 through the DDC 140. The PC 300 then sends a video signal matching the received display device information to the PC 300 through the DDC 140. Therefore, the display device 100 can display an image based on the PC video signal supplied from the PC 300 oh the display screen 111*a*.

The microcontroller 201 sets a display mode for the display device 100 based on a control signal that is supplied from the photodetector 203 in response to a signal sent from the remote controller operated by the user. Depending on the set display mode, the microcontroller 201 controls a video signal switcher 216 and a stereophonic audio signal switcher 231, and sends the display mode information to the PC 300 through the DDC 140.

Display modes that can be set for the display device 100 include a TV video display mode for displaying an image based on a TV video signal and outputting a sound based on a TV audio signal, a PC video display mode for displaying an image based on a PC video signal and outputting a sound based on a PC audio signal, and a W image display mode for displaying an image based on a TV video signal as an inset image in an image based on a PC video signal or vice versa.

Though control lines are omitted from illustration in FIG. 15, the microcontroller 201 controls reducing magnification units 217-1, 217-2, enlarging magnification units 219-1, 219-2, a signal mixer 220 depending on the display mode.

The internal circuit 200 also includes a tuner 211 for receiving broadcast signals from broadcasting stations.

The tuner 211 receives RF (Radio Frequency) signals from an antenna or the like, not shown, selects a signal from a certain broadcasting station from the received RF signals, demodulates an IF (Intermediate Frequency) signal of the selected signal into an analog VIF/SIF (Video Intermediate Frequency/Sound Intermediate Frequency) signal, i.e., detected video and audio signals (baseband signals), and outputs the baseband signals to decoder 212.

The decoder 212 decodes the detected video signal into an analog video signal, and outputs the analog video signal to a video signal format converter 213. The decoder 212 also decodes the detected audio signal into an analog audio signal, and supplies the analog audio signal to the stereophonic audio signal switcher 231.

The video signal format converter 213 converts the analog video signal input from the decoder 212 into a digital video signal, and outputs the digital video signal to a video rotator 214. Specifically, since the video signal format converter 213 is supplied with 480*i* (interlaced) analog YC signals (luminance and color signals) from the decoder 212, the video signal format converter 213 converts the 480*i* analog YC signals into 1024×768(progressive) digital YPbPr signals (luminance and color difference signals), for example.

The video rotator 214 stores the digital video signal input from the video signal format converter 213 into a frame memory 215, reads the stored digital video signal from the frame memory 215, and outputs the read digital video signal, which is a 1024×768 video signal, for example, to the video signal switcher 216. If the video rotator 214 is supplied with a screen rotation signal from the screen rotation detector 205, i.e., if the display unit 110 is turned from the landscape display mode to the portrait display mode or vice versa, then the video rotator 214 reads the video signal stored in the frame memory 215, rotates the read video signal through 90°, and outputs the rotated video signal, which is a 768×1024 video signal if the display unit 110 is turned from the landscape display mode to the portrait display mode, or remains to be a 1024×768 video signal if the display unit 110 is turned from the portrait display mode to the landscape display mode, to the video signal switcher 216. The frame memory 215 temporarily stores a video signal received by the video rotator 214, i.e., a video signal required in the processing operation of the video rotator 214.

The video signal switcher 216 is controlled by the microcontroller 201 to select at least one of the digital video signal (TV video signal) input from the video rotator 214 and the video signal (PC video signal) input from the PC 300 through the communication interface 204. Then, the video signal switcher 216 outputs the selected TV video signal or PC video signal to the reducing magnification unit 217-1 (if the TV video signal is selected) or the reducing magnification unit 217-2 (if the PC video signal is selected).

If the display mode is the W image display mode and an image based on a TV video signal is displayed as the inset image, then the reducing magnification unit 217-1 reduces the magnification of the TV video signal input from the video signal switcher 216 to an inset image size specified by the display device 100 depending on whether the display unit 110 is in the landscape display mode or the portrait display mode, and outputs the magnification-reduced TV video signal to a digital format converter 218.

For example, if the display unit 110 is in the landscape display mode, then since the reducing magnification unit 217-1 is supplied with a 1024×768 video signal, the reducing magnification unit 217-1 reduces the magnification of the video signal to an inset image size (320×240 or 640×480), and outputs the magnification-reduced image signal. Conversely, if the display unit 110 is in the portrait display mode, then since the reducing magnification unit 217-1 is supplied with a 768×1024 video signal, the reducing magnification unit 217-1 reduces the magnification of the video signal to an inset image size (240×320 or 480×640), and outputs the magnification-reduced image signal. Otherwise, i.e., if the display mode is the TV video display mode or the W image display mode with an image based on a TV video image being displayed as the main image, then the reducing magnification unit 217-1 outputs the TV video signal as it is to the digital format converter 218.

If the display mode is the W image display mode and an image based on a PC video signal is displayed as the inset image, then the reducing magnification unit 217-2 reduces the magnification of the PC video signal, e.g., a 640×480 (VGA) digital RGB signal, input from the video signal switcher 216 to a specified inset image size, and outputs the magnification-reduced PC video signal to the enlarging magnification unit 219-2. Otherwise, the reducing magnification unit 217-2 outputs the PC video signal as it is to the enlarging magnification unit 219-2.

The digital format converter 218 adjusts the image quality of the TV video signal (digital YPbPr signals) from the reducing magnification unit 217-1, then converts the TV video signal into a digital RGB signal, and outputs the converted TV video signal (digital RGB signal) to the enlarging magnification unit 219-1.

If the TV video signal is not displayed as an inset image, but as a full-screen image, and the resolution of the input TV video signal is lower than the display panel resolution, e.g., 1680×1050, then the enlarging magnification unit 219-1 enlarges the input TV video signal depending on whether the display unit 110 is in the landscape display mode or the portrait display mode, and outputs the magnification-enlarged TV video signal to the signal mixer 220. If the TV video signal is displayed as an inset image, then the enlarging magnification unit 219-1 outputs the TV video signal as it is to the signal mixer 220.

For example, if the display unit 110 is in the landscape display mode, then since the enlarging magnification unit 219-1 is supplied with a 1024×768 video signal, the enlarging magnification unit 219-1 enlarges the magnification of the video signal to a resolution (size) (1680×1050) of the display panel 111, and outputs the magnification-enlarged image signal. Conversely, if the display unit 110 is in the portrait display mode, then since the enlarging magnification unit 219-1 is supplied with a 768×1024 video signal, the enlarging magnification unit 219-1 enlarges the magnification of the video signal to a resolution (size) (1050×1680) of the display panel 111, and outputs the magnification-enlarged image signal.

If the PC video signal is not displayed as an inset image, but as a full-screen image, and the resolution of the input PC video signal, e.g., a 640×480 (VGA) digital RGB signal, is lower than the resolution, e.g., 1680×1050, of the display panel 111, then the enlarging magnification unit 219-2 enlarges the input PC video signal, and outputs the magnification-enlarged PC video signal to the signal mixer 220. If the PC video signal is displayed as an inset image, then the enlarging magnification unit 219-2 outputs the PC video signal as it is to the signal mixer 220.

The signal mixer 220 is supplied with at least one of the TV video signal from the enlarging magnification unit 219-1 and the PC video signal from the enlarging magnification unit 219-2. If the signal mixer 220 is supplied with either of one the TV video signal (1680×1050) and the PC video signal (1680×1050), i.e., if the display mode is the TV video display mode or the PC video display mode, then the signal mixer 220 converts the input video signal into a TTL (Transistor-Transistor Logic) signal, and outputs the TTL signal to a digital format converter 221.

If the signal mixer 220 is supplied with both the TV video signal from the enlarging magnification unit 219-1 and the PC video signal from the enlarging magnification unit 219-2, then the signal mixer 220 superposes (combines) the video signal (320×240) for an inset image on the video signal (1680×1050) for a main image, converts the combined video signal into a TTL signal, and outputs the TTL signal to a digital format converter 221.

The digital format converter 221 converts the TTL video signal input from the signal mixer 220 into a format with which the display panel 111 is compatible, such as an LVDS (Low Voltage Differential Signaling) format, a TMDS (Transition Minimized Differential Signaling) format, or an RSDS (registered trademark) (Reduced Swing Differential Signaling Interface) format, and outputs the format-converted video signal to the display panel 111. The display panel 111 now displays on its display screen 111a an image represented by the video signal supplied from the digital format converter 221.

The stereophonic audio signal switcher 231 is controlled by the microcontroller 201 to select at least one of the stereophonic audio signal (TV audio signal) input from the decoder 212 and the stereophonic audio signal (PC audio signal) input from the PC 300 through the communication interface 204, and outputs the selected stereophonic audio signal to a stereophonic preamplifier 232.

The stereophonic preamplifier 232 performs left and right sound volume adjustment and sound quality adjustment (tone control, loudness control, muting, etc.) on the stereophonic audio signal input from the stereophonic audio signal switcher 231, and outputs the adjusted stereophonic audio signal (left and right audio signals) to a channel matrix switcher 233.

The channel matrix switcher 233 outputs the left and right audio signals input from the stereophonic preamplifier 232 to audio signal amplifiers 234 for radiating corresponding sounds from the speakers 114-1, 114-2, 114-3, 114-4.

Specifically, the channel matrix switcher 233 switches a selector incorporated therein for outputting the left audio signal to those audio signal amplifiers 234 which correspond to the speakers 114 that are disposed on the left side of the display unit 110, as viewed from the front side thereof, and outputting the right audio signal to those audio signal amplifiers 234 which correspond to the speakers 114 that are disposed on the right side of the display unit 110, as viewed from the front side thereof.

The audio signal amplifier 234 adjusts amplification factors for the audio signals to be output to the speakers 114 depending on the screen rotation signal supplied from the screen rotation detector 205, amplifies the audio signals at the adjusted amplification factors, and outputs the amplified audio signals to the corresponding speakers 114. Specifically, amplification factors are preset in the landscape display mode and the portrait display mode, and are switched depending on the screen rotation signal supplied from the screen rotation detector 205. In this manner, the amplification factors for the audio signals are adjusted.

The internal circuit 200 described above may be incorporated in the display device 1 according to the first embodiment.

In each of the above embodiments, the ratio of the vertical and horizontal dimensions of the display panel is essentially the same as the ratio of the vertical and horizontal dimensions of the display unit housing. However, the ratio of the vertical and horizontal dimensions of the display panel may be different from the ratio of the vertical and horizontal dimensions of the display unit housing. The center of the display panel and the center of the display unit housing may not necessarily be aligned with each other. If the center of the display panel and the center of the display unit housing are not aligned with each other, then the rotational center may be established based on the center of the display panel, so that horizontal position of the center of the display panel remains the same in the landscape display mode and the portrait display mode. If the rotational center is established based on the center of the display unit housing, then the lower edge of the display unit in the landscape display mode and the lower edge of the display unit in the portrait display mode can easily be controlled in position. The ratio of the vertical and horizontal dimensions of the display panels 11, 111 may not be 5:8, but may be 3:4 or 9:16, for example.

The configurational and structural details of the various parts of the display devices according to the above embodiments have been described and shown by way of illustrative example only, and should not be interpreted as unduly restricting the scope of the present invention.

What is claimed is:

1. A display device comprising:
   a housing holding a display panel including a display screen which is of an elongate rectangular shape as viewed in front elevation; and
   a stand, said housing being angularly movably supported on said stand for angular movement about a support shaft extending perpendicular to said display screen;
   said support shaft being positioned on a line extending from a center of said display screen, obliquely upwardly at an angle of 45°, while said display screen is positioned in a landscape display mode, wherein the display screen is positioned on a same vertical line in the landscape display mode as in the portrait display mode.

2. The display device according to claim 1, wherein a distance between a lower end of said housing and said support shaft when said display screen is positioned in said landscape display mode and a distance between the lower end of said housing and said support shaft when said display screen is positioned in a portrait display mode are essentially equal to each other.

3. The display device according to claim 1, wherein said support shaft is vertically tiltably supported on said stand, further comprising:
   lock means for preventing said housing from being angularly moved with respect to said support shaft when said support shaft is in a normal position at a lower end of the range of vertical tilting movement thereof, and for allowing said housing to be angularly moved with respect to said support shaft when said support shaft is tilted upwardly from said normal position.

* * * * *